US012139439B2

(12) United States Patent
Hoffmann

(10) Patent No.: US 12,139,439 B2
(45) Date of Patent: Nov. 12, 2024

(54) METHOD FOR PREPARING AN ETTRINGITE BINDER FOR PRODUCING CONSTRUCTION MATERIALS

(71) Applicant: HOFFMANN GREEN CEMENT TECHNOLOGIES, Rives de l'Yon (FR)

(72) Inventor: David Hoffmann, Saint-Ouën-des-Toits (FR)

(73) Assignee: HOFFMANN GREEN CEMENT TECHNOLOGIES, Rives de l'Yon (FR)

( * ) Notice: Subject to any disclaimer, the term of this patent is extended or adjusted under 35 U.S.C. 154(b) by 95 days.

(21) Appl. No.: 16/761,620

(22) PCT Filed: Nov. 7, 2018

(86) PCT No.: PCT/FR2018/052747
§ 371 (c)(1),
(2) Date: May 5, 2020

(87) PCT Pub. No.: WO2019/092360
PCT Pub. Date: May 16, 2019

(65) Prior Publication Data
US 2021/0179492 A1   Jun. 17, 2021

(30) Foreign Application Priority Data
Nov. 7, 2017 (FR) .................................... 1760422

(51) Int. Cl.
*C04B 14/10* (2006.01)
*C04B 7/32* (2006.01)
*C04B 18/06* (2006.01)
*C04B 22/06* (2006.01)
*C04B 22/14* (2006.01)
*C04B 28/06* (2006.01)

(52) U.S. Cl.
CPC ............ *C04B 28/065* (2013.01); *C04B 7/323* (2013.01); *C04B 14/106* (2013.01); *C04B 18/067* (2013.01); *C04B 22/064* (2013.01); *C04B 22/143* (2013.01); *Y02P 40/10* (2015.11)

(58) Field of Classification Search
CPC ..... C04B 28/065; C04B 7/323; C04B 14/106; C04B 18/067; C04B 22/064; C04B 22/143; C04B 22/00867; C04B 28/04; C04B 14/28; C04B 28/08; C04B 7/153; C04B 7/32; C04B 11/00; C04B 11/26; C04B 11/30; C04B 28/00; C04B 28/14; C04B 14/10; C04B 18/06; C04B 22/06; C04B 22/14; C04B 28/06
See application file for complete search history.

(56) References Cited

U.S. PATENT DOCUMENTS

| | | | | | |
|---|---|---|---|---|---|
| 4,286,992 A | * | 9/1981 | Galer | .................... | C04B 28/065 106/695 |
| 5,958,131 A | * | 9/1999 | Asbridge | .............. | C04B 14/106 106/718 |
| 6,818,057 B2 | * | 11/2004 | Hanley | ............... | C04B 40/0039 106/695 |
| 2012/0145044 A1 | * | 6/2012 | Mills | ........................ | C04B 28/14 427/427 |
| 2014/0360721 A1 | | 12/2014 | Getzlaf et al. | | |
| 2018/0105466 A1 | * | 4/2018 | Wilde | ................... | C04B 28/147 |

FOREIGN PATENT DOCUMENTS

| | | | | |
|---|---|---|---|---|
| DE | 29701606 U1 | | 3/1997 | |
| DE | 102013200122 A1 | * | 7/2014 | ............. C04B 28/14 |
| EP | 0271329 A2 | * | 6/1988 | ............. C04B 7/323 |
| EP | 3067338 A1 | * | 9/2016 | ........... C04B 28/141 |
| EP | 2 727 894 B1 | | 3/2017 | |
| ES | 2374674 A1 | * | 2/2012 | ........... C04B 28/145 |
| KR | 10-1399952 B1 | | 5/2014 | |
| WO | 88/04285 A1 | | 6/1988 | |
| WO | 03/091179 A1 | | 11/2003 | |
| WO | 2007/109862 A1 | | 10/2007 | |
| WO | 2010/085537 A2 | | 7/2010 | |
| WO | 2011/020975 A2 | | 2/2011 | |
| WO | 2012/083255 A1 | | 6/2012 | |
| WO | 2014/141051 A1 | | 9/2014 | |
| WO | WO-2016142365 A1 | * | 9/2016 | ............. C04B 28/14 |

OTHER PUBLICATIONS

Hu, Y., Li, W., Ma, S. et al. Influence of borax and citric acid on the hydration of calcium sulfoaluminate cement. Chem. Pap. 71, 1909-1919 (2017). doi:10.1007/s11696-017-0185-9 (Year: 2017).*
DE-102013200122-A1, machine translation (Year: 2014).*
ES-2374674-A1, machine translation (Year: 2012).*
Britannica. Kaolin. [retrieved from the internet at Dec. 14, 2023 from <URL:https://www.britannica.com/science/kaolin> and the wayback machine <URL:https://www.britannica.com/science/kaolin>] (Year: 2015).*
International Search Report and Written Opinion issued on Feb. 19, 2019 in corresponding International Application No. PCT/FR2018/052747; 11 pages.
English translation of extract of "11.4.3 Novel Concrete Setting Modifiers and Early-Strength Agents", Science & Technology Inorganic Material, South China University of Technology Press, 2016, 4 pages.
English translation of extract of "3.4 Inert Polymer-Cement System", China Architecture & Building Press, 1987, 2 pages.

(Continued)

*Primary Examiner* — Anthony J Green
*Assistant Examiner* — Marites A Guino-O Uzzle
(74) *Attorney, Agent, or Firm* — Maier & Maier, PLLC

(57) ABSTRACT

A method for preparing an ettringite binder from an aluminosilicate source, a calcium sulfate source and a calcium hydroxide (or slaked lime, CH) source, the binder including a catalyst and/or an activator. Also the use of the ettringite binder produced by the method for producing cement, masonry cement, mortar, concrete, road binders and/or formulated lime.

12 Claims, 1 Drawing Sheet

(56) References Cited

OTHER PUBLICATIONS

Duxson et al., "Understanding the Relationship Between Geopolymer Composition, Microstructure and Mechanical Properties", Colloids and Surfaces A: Physicochem Eng. Aspects 269, 2005, pp. 47-58.

Rowles et al., "Chemical Optimisation of the Compressive Strength of Aluminosilicate Geopolymers Synthesis by Sodium Silicate Activation of Metakaolinite", Journal of Materials Chemistry, May 2003, vol. 13, pp. 1161-1165.

Kamalloo et al., "Modeling of Compressive Strength of Metakaolin Based Geopolymers by the Use of Artifical Neural Network", International Journal of Engineering, vol. 23, No. 2, Apr. 2010, pp. 145-152.

Li et al., "A Review: The Comparison Between Alkali-Activated Slag (Si + Ca) and Metakaolin (Si + Al) Cements", Cement and Concrete Research, vol. 40, 2010, pp. 1341-1349.

San Nicolas et al., "Characteristics and Applications of Flash Metakaolins", Applied Clay Science, vol. 83-84, 2013, pp. 253-262.

Chi et al., "Effect of Montmorillonite as Additive on the Properties of Cement-Based Composites", Sci. Eng. Compos. Mater, vol. 19, 2012, pp. 45-54.

Lee et al., "The Effects of Inorganic Salt Contamination on the Strength and Durability of Geopolymers", Colloids and Surfaces A: Physicochem. Eng. Aspects 211, 2002, pp. 115-126.

\* cited by examiner

METHOD FOR PREPARING AN ETTRINGITE BINDER FOR PRODUCING CONSTRUCTION MATERIALS

FIELD

The present invention relates to the field of construction materials. The present invention relates in particular to a method for preparing an ettringite binder from an aluminosilicate source, a calcium sulfate source and a calcium hydroxide (or slaked lime, CH) source, said binder comprising a catalyst and/or an activator.

The present invention also relates to the use of the ettringite binder produced by the method according to the invention for producing cements, masonry cements, mortars, concretes, road binders and/or formulated limes.

BACKGROUND

The preparation of construction materials such as, for example, concrete or cement, requires the availability of evermore innovative binders in order to respond to the needs in this field.

Among the known and used binders, ettringite binders have the advantage when they are mixed with water, of hardening quickly in order to provide materials having low shrinkage and a good chemical resistance.

These binders are mainly prepared according to two methods: either by hydration of a Ye'elemite-based clinker (WO88/04285) or by formulation from an aluminous cement (WO03/091179).

The first method, by hydration, requires producing a clinker at high temperatures (1200-1300° C.). The second method, by formulation, requires the use of numerous additives and expensive raw materials.

There is therefore a need to provide a method for preparing an ettringite binder that is simpler to implement and less expensive in energy. In particular, there is a need to provide a method for preparing an ettringite binder without heating. Furthermore, there is a need to provide a more economic method, which can be carried out using easily obtainable and inexpensive raw materials, and having a smaller carbon footprint than the methods of the prior art. With this aim, the Applicant is seeking in particular to provide a method for preparing ettringite binder which can be obtained without using Portland cement. Indeed, its production also requires many resources and produces a non-negligible quantity of pollutants, making its use undesirable for binder preparation with a reduced carbon footprint.

Surprisingly, the Applicant has shown that a mixture comprising at least, a source of aluminosilicate, a source of calcium sulfate and of lime, characterised by a stoichiometric ratio of available calcium sulfate (RMK) in the mixture in a range from 0.05 to 1.25, and a level of calcium hydroxide saturation, Sat(CH) in the range from 0.75 to 8, makes it possible to prepare a stable ettringite binder.

Furthermore, the Applicant has shown that a mixture comprising at least, a source of aluminosilicate, a source of calcium sulfate and of a calcium hydroxide source, in presence of an activator selected from compounds able of complexing with cations such as calcium, aluminium and/or silicon, allows obtaining materials having compressive strengths higher, with best yields, than conventional ettringite binders.

Advantageously, the method according to the invention enables the production of an ettringite binder and/or a stable ettringite. In addition, during the use of the ettringite binder and/or the ettringite of the invention in the production of a construction material, this does not lead over time to any swelling in the final material, while presenting better mechanical performance than the conventional pozzolan binders.

SUMMARY

The present invention thus relates to an ettringite binder comprising:
- at least one aluminosilicate source;
- at least one calcium sulfate source;
- at least one calcium hydroxide source; and
- at least one activator chosen among the compounds suitable for complexing cations, preferably compounds suitable for complexing calcium, aluminium and/or silicon.

According to an embodiment, the activator is chosen among sucrose, alpha hydroxy acids or the salts thereof, ethanolamines or the salts thereof, and/or catechols and the derivatives thereof.

According to an embodiment, the binder further comprises an alkali catalyst, preferably an alkali catalyst chosen among sodium fluoride, sodium aluminate, trisodium phosphate, sodium orthosilicate, sodium metasilicate, sodium hexafluorosilicate, sodium fluorophosphate, sodium hexametaphosphate, sodium carbonate, sodium borate, sodium hexafluoroaluminate, potassium tetrafluoroaluminate or the mixtures thereof.

According to an embodiment, the quantity by mass of catalyst is in a range of more than 0% to 20% with respect to the total quantity of the binder.

According to an embodiment, the aluminosilicate source is a pozzolan, a fine originating from the chamotte production or ash of papermaking sludge, preferably a metakaolin.

According to an embodiment, the calcium hydroxide is slaked lime, hydraulic lime, quick lime, delayed-effect quick lime, air lime, conventional slaked lime or any commercial lime.

According to an embodiment, the calcium sulfate source is chosen among anhydrite, natural gypsum or gypsum obtained as a by-product of industrial reactions, such as desulfogypsum, titanogypsum, fluogypsum, or phosphogypsum.

According to an embodiment, the binder further comprises additives, preferably slag, more preferably blast furnace slag or amorphous aluminate slag.

According to an embodiment, the aluminosilicate source is characterised by a pozzolanic activity index (IPZ), determined by the Chapelle test method, of from 200 to 2200 mg/g.

According to an embodiment, the mixture (aluminosilicate source/calcium sulfate source/calcium hydroxide source) comprises or consists of:
- 50% by mass flash metakaolin ARGICEM® with IPZ approximately equal to 800 mg/g;
- 25% by mass lime; and
- 25% by mass gypsum, with respect to the total mass of the mixture.

According to an embodiment, the mixture (aluminosilicate source/calcium sulfate source/calcium hydroxide source) comprises or consists of:
- 60% by mass flash metakaolin ARGICEM® with IPZ approximately equal to 800 mg/g;
- 30% by mass lime; and
- 10% by mass gypsum, with respect to the total mass of the mixture.

The present invention also concerns a method for preparing a binder as described above, comprising the mixing of at least:
- an aluminosilicate source;
- a calcium sulfate source;
- a calcium hydroxide source; and
- at least one activated chosen among the compounds suitable for complexing cations, preferably compounds suitable for complexing calcium, aluminium and/or silicon.

According to an embodiment, temperature at which the mixing is carried out is from more than 0° C. to 50° C., preferably from 10° C. to 40° C., more preferably at approximately 25° C.

The present invention also concerns the use of the ettringite binder according to the invention, as described above, for preparing cement, masonry cement, mortar, concrete, road binders and/or formulated lime.

DETAILED DESCRIPTION

Figure 1:
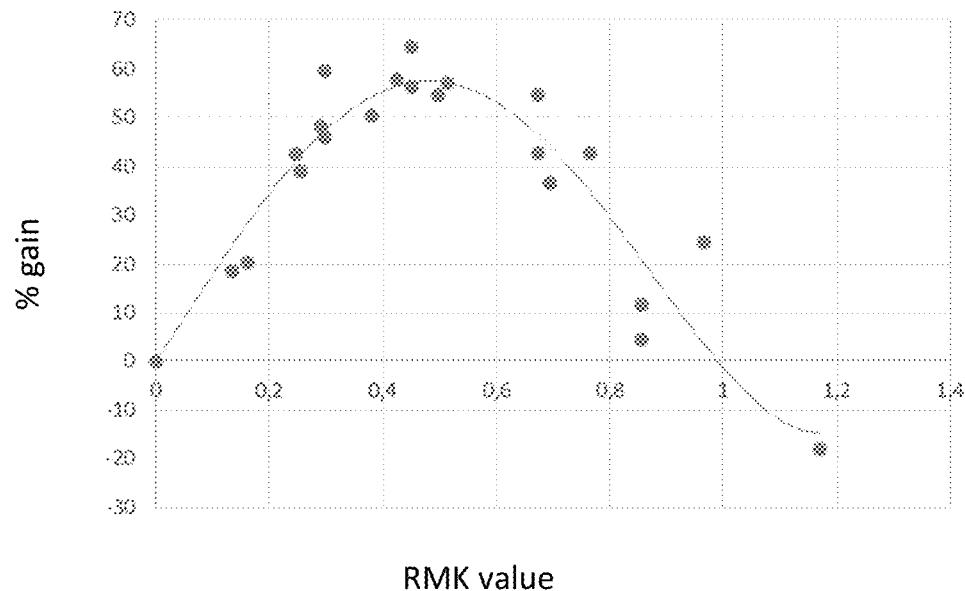
FIG. 1 is a graph showing the percentage increase in mechanical performance after 28 days, for an ettringite binder obtained from the mixture according to the invention with respect to those of a conventional pozzolanic composition, as a function of the value of the parameter RMK.

In the present invention, the terms below are defined in the following manner:
"Alpha hydroxy acid" concerns a carboxylic acid comprising a hydroxyl group (—OH) on the carbon adjacent to the carboxylic function.
"Activator" concerns any product capable of increasing the reaction yield during the formation of ettringite.
"Aluminosilicate" concerns a mineral chemical compound of the family of silicates in which certain silicon (Si) atoms have been replaced by aluminium atoms.
"Anhydrite" concerns a mineral or chemical compound of anhydrous calcium sulfate, of empirical formula $CaSO_4$.
"Concrete" concerns a mortar in which the size of the aggregates is greater than 4 mm
"Catalyst" concerns any chemical participating in a chemical reaction in order to increase the rate, but which is be regenerated or removed during or at the end of the reaction. According to an embodiment, "catalyst" means any chemical capable of accelerating the rate of reaction between the aluminosilicate source (such as a metakaolin, for example) and the calcium hydroxide source (such a slaked lime, for example); preferably in order to obtain calcium aluminate.
"Alkali catalyst": concerns a catalyst comprising at least one alkali element (i.e. at least one metal of the group of alkali metals, preferably lithium (Li), sodium (Na), potassium (K), rubidium (Rb), caesium (Cs) or francium (Fr)).
"Catechol" or "Pyrocatechol" or "1,2-benzenediol": concerns an organic compound of empirical formula $C_6H_4(OH)_2$.

"Sludge ash": concerns ash originating from the combustion of sludge obtained from the manufacture of pulp.
"Lime" or "Air lime" or "Slaked lime": concerns a mineral chemical compound of calcium hydroxide, of empirical formula $Ca(OH)_2$. These terms designate the lime obtained by hydration of quick lime. According to an embodiment, these terms also designate the compounds having calcium hydroxide as main component, and comprising solid impurities as minority compounds.
"Natural hydraulic lime": concerns a lime that is extracted with water and then with air, formed from a calcareous deposit containing a little clay.
"Quick lime": designates the anhydrous lime obtained from the lime kiln after pyrolysis at 900° C. The majority compound of quick lime is calcium oxide (CaO).
"Delayed effect lime": concerns a quick lime obtained from a special curing method which slows rehydration during contact with water.
"Cement": concerns a hydraulic binder (i.e. a mineral powder) which sets and hardens in contact with water or a saline solution.
"Masonry cement": concerns a cement, the performance of which has been modified in order to make it directly usable in masonry.
"Complex-forming agent": concerns any product capable of complexing an ion; preferably a cation; more preferably an alkaline earth metal cation. According to an embodiment, the complex-forming agent is a compound capable of complexing the elements calcium (Ca), aluminium (Al) and silicon (Si).
"Desulfogypsum": designates a gypsum obtained during desulfurisation of combustion gases of coal and fuel oil, in particular in the case of thermal power stations and nuclear power plants. According to an embodiment, desulfogypsum is a manufacturing by-product (waste from thermal power stations).
"Ettringite": designates a mineral species composed of calcium sulfate and hydrated aluminium, of formula $Ca_6Al_2(SO_4)_3(OH)_{12}26H_2O$.
"Ethanolamines": concerns an organic compound of formula HO—$(CH_2)_2$—$NH_2$ (monoethanolamine), formula HO—$(CH_2)_2$—NH—$(CH_2)_2$—OH (diethanolamine), or formula $N[(CH_2)_2—OH]_2$ (triethanolamine)
"Fluogypsum": designates a gypsum obtained during the manufacture of hydrofluoric acid. According to an embodiment, fluogyspum is a by-product of hydrofluoric acid manufacture (waste).
"Gypsum": concerns a dihydrated compound of calcium sulfate, of formula $CaSO_4.2H_2O$.
"IPZ" or "Pozzolanic index" or "Pozzolanic activity index": represents the active fraction of an aluminosilicate such as a metakaolin, in other words the quantity of calcium hydroxide, $Ca(OH)_2$, that can be fixed in one gram of aluminosilicate. This index (expressed in mg/g) can be determined by the methods known to a person skilled in the art, such as the Chapelle test (M. CYR and G. ESCADEILLAS, http://dspace.univ-tlemcen.dz/bitstream/112/624/1/Normalisation-du-metakaolin-pourquoi-comment.pdf).
"Slag": designates the slags formed during the melting or processing of a metal by liquid means. Slag is composed of a mixture of silicates, aluminates and lime, and optionally of metal oxides with the exception of iron oxides.

"Blast furnace slag": concerns any by-product of the steel industry formed during the preparation of cast iron from iron ore.

"Amorphous aluminate slag": concerns an iron industry slag with a high aluminium content, the cooling of which has made the structure amorphous.

"Hydraulic binder": concerns any powder mixture having the property during its hydration of solidifying then hardening, acquiring mechanical properties such as compressive strength, tensile strength or adhesion.

"Ettringite binder": concerns a hydraulic binder, the constituents of which should, during their hydration, transform and provide, as the main hydrate, ettringite of formula $3CaO,Al_2O_3.3CaSO_4.32H_2O$.

"Metakaolin": concerns a powder originating from the calcination and/or grinding of a clay. According to an embodiment, metakaolin is a powder originating from the calcination and grinding of a clay mostly composed of kaolinite. According to an embodiment, metakaolin is a powder mainly consisting of amorphous aluminosilicate particles essentially composed of reactive silicon dioxide ($SiO_2$) and aluminium oxide ($Al_2O_3$).

"Mortar": concerns a formulation comprising or constituted by a binder, sand, water and optionally additives.

"Phosphogypsum": designates gypsum formed during the manufacture of phosphoric acid from natural phosphate. According to an embodiment, phosphogypsum is a by-product of phosphoric acid manufacture (waste).

"Pozzolan": concerns a natural or artificial, siliceous-aluminous material, that is able to combine with lime, at ordinary temperature and in the presence of water.

"RMK" is defined by the following equation:

$$RMK = \frac{[Qm(C\$) \times 592000]}{IPZ \times Q(MK) \times 3}$$

in which:
IPZ represents the pozzolanic index of the aluminosilicate source; Q(MK) represents the mass quantity, preferably in grams, of aluminosilicates present in the ettringite binder; and
Qm(C) represents the molar quantity of calcium sulfate present in the ettringite binder.

"Sucrose": designates a chemical compound of a glucose molecule and a fructose molecule joined by their reducing groups and having formula $C_{12}H_{22}O_{11}$.

"Sat(CH)" represents the level of saturation by mass of calcium hydroxide, $Ca(OH)_2$ in a given composition. It is determined according to the following equation (e1):

$$Sat(CH) = \frac{Q(CH)}{QST(CH)} \quad (e1)$$

where:
Q(CH) represents the quantity in grams of calcium hydroxide ($Ca(OH)_2$) in the mixture according to the invention; and
QST(CH) represents the quantity in grams of calcium hydroxide stoichiometrically necessary for the reaction forming ettringite. The parameter QST(CH) may be determined according to the following equation (e2):

$$QST(CH) = \frac{[IPZ \times Q(MK) \times 0.000625]}{P(CH)} \quad (e2)$$

where:
IPZ represents the pozzolanic index as defined above;
Q(MK) represents the quantity in grams of metakaolin or aluminosilicates present in the mixture; and
P(CH) represents the purity of the calcium hydroxide source, such as lime for example, in calcium hydroxide.

"Calcium sulfate": concerns an anhydrous mineral chemical compound of formula $CaSO_4$.

"Titanogypsum": designates the gypsum formed during the manufacturer of titanium. According to an embodiment, titanogypsum is a by-product during titanium manufacture (waste).

"Gypsum from demolition": designates the gypsum obtained by grinding plasterboards or all forms of construction gypsum.

Method

The invention therefore concerns a method for preparing a hydraulic binder, preferably an ettringite binder. According to one embodiment, the method of the invention concerns preparing a hydraulic binder for obtaining ettringite as main hydrate, preferably primary ettringite.

In particular, the invention concerns a method for preparing a hydraulic binder or an ettringite binder comprising a step of mixing at least:
an aluminosilicate source;
a calcium sulfate source; and
a calcium hydroxide (or lime) source.

According to an embodiment, the aluminosilicate source comprises or consists of an aluminosilicate. According to an embodiment, the aluminosilicate source comprises or consists of a metakaolin, a calcined clay or a fine originating from chamotte production. According to an embodiment, the method for preparing an ettringite binder does not comprise the use of Portland cement. According to an embodiment, the aluminosilicate source is a pozzolan, a fine originating from chamotte production or stationery sludge ashes, preferably a metakaolin.

According to an embodiment, the metakaolin is a commercial product, preferably the metakaolin is the metakaolin Argicem®, the metakaolin Argical M1000®, Argical M1200S®, Metastar® M501. Soka Metasial® or their equivalents. According to an embodiment, the aluminosilicate source is a fine originating from the chamotte industry.

According to an embodiment, the calcium sulfate is chosen among anhydrite, natural gypsum or gypsum obtained as a by-product of industrial reactions, such as desulfogypsum, titanogypsum, fluogypsum, or phosphogypsum. According to an embodiment, the calcium sulfate source comprises or consists of gypsum, anhydrite and/or plaster. According to an embodiment, the calcium sulfate source is alpha and/or beta plaster. According to an embodiment, the calcium sulfate source comprises or consists of anhydrite, preferably natural anhydrite.

According to an embodiment, the calcium hydroxide source is slaked lime. According to an embodiment, the calcium hydroxide source is air lime. According to an embodiment, the calcium hydroxide source is hydraulic lime. According to an embodiment, the calcium hydroxide source is air lime. According to an embodiment, the calcium hydroxide source is obtained from quick lime.

According to an embodiment, the calcium hydroxide source is chosen among the commercial limes, for example LHOIST® CL80 lime, LHOIST® CL90 lime, LHOIST Sorbacal® lime or Decorchaux® CL90 slaked air lime.

According to an embodiment, the mixture (aluminosilicate source/calcium sulfate source/lime) can further comprise at least (i) a catalyst, preferably an alkali catalyst; (ii) a reaction activator; and/or (iii) a secondary additive such as a filler, preferably a calcareous filler. According to an embodiment, the binder of the invention may further comprise at least (i) a catalyst, preferably an alkaline catalyst; (ii) an activator of reaction, and/or (iii) a secondary additive such as a load, preferably a limestone filler.

According to an embodiment, the secondary additive is a mineral filler, preferably chosen among calcareous fillers, siliceous fillers or granulated slag.

According to an embodiment, the invention concerns a method for preparing a hydraulic binder or an ettringite binder comprising a step of mixing at least:
an aluminosilicate source;
a calcium sulfate source;
a calcium hydroxide source (or lime);
and optionally a catalyst and/or an activator.

According to an embodiment, the invention concerns a method for preparing a hydraulic binder or an ettringite binder comprising a step of mixing at least:
an aluminosilicate source;
a calcium sulfate source;
a calcium hydroxide source (or lime);
and optionally a catalyst and/or an activator chosen among the alkali aluminates and the compounds suitable for complexing cations, in particular calcium, such as sucrose, tartaric acid, citric acid, gluconic acid, mandelic acid, lactic acid, or an ethanolamine such as triethanolamine (TEA).

According to an embodiment, the invention concerns a method for preparing a hydraulic binder or an ettringite binder comprising a step of mixing at least:
an aluminosilicate source;
a calcium sulfate source;
a calcium hydroxide source (or lime);
and a mixture for accelerating the setting comprising a catalyst and/or an activator.

Advantageously, adding at least one catalyst et at least one activator in the binder allows accelerating the setting of said binder during its hydration in order to obtain a construction material.

According to an embodiment, the invention concerns a method for preparing a hydraulic binder or an ettringite binder comprising a step of mixing at least:
an aluminosilicate source;
a calcium sulfate source;
a calcium hydroxide source (or lime);
sucrose;
tartaric acid; and
an alkaline aluminate, preferably sodium aluminate.

According to an embodiment, the mixture or the binder of the invention does not comprise oxalic acid, triethanolamine and/or potassium aluminate. According to an embodiment, the mixture or the binder of the invention does not comprise tartaric acid and/or sucrose. According to an embodiment, the mixture or the binder of the invention does not comprise mucic acid, malic acid, tartaric acid, citric acid, sucrose and/or hydroxypolycarboxilic acid.

According to an embodiment, the mixture or the binder of the invention comprises:
a flash metakaolin ARGICEM® with IPZ between 700 and 800 mg/g;
a slaked lime of type CL90 with LEDUC lime content of approximately 90%; and
gypsum.

According to an embodiment, the mixture or the binder of the invention comprises:
a metakaolin Argical M1000®;
a quarry calcium sulfate;
lime CL90;
a catalyst; and
an activator.

According to an embodiment, the mixture or the binder of the invention comprises:
flash metakaolin ARGICEM® with IPZ approximately equal to 700 mg/g;
slaked lime of type CL90 with LEDUC lime content of approximately 90%; and
desulfogypsum; and
$NaAlO_2$ (1.3%) as catalyst.

According to an embodiment, the mixture comprises from 0% to 20%, preferably from 0% to 15%, more preferably from 1% to 10% of catalysts, by mass with respect to the total mass of the mixture. According to an embodiment, the mixture comprises from 1% to 20%, preferably from 2% to 20%, from 3% to 20%, from 4% to 20%, from 5% to 20%, from 6% to 20%, from 7% to 20%, from 8% to 20%, from 9% to 20%, from 10% to 20%, from 11% to 20%, from 12% to 20%, from 13% to 20%, from 14% to 20%, from 15% to 20%, from 16% to 20%, from 17% to 20%, from 18% to 20%, from 19% to 20%, of catalysts, by mass with respect to the total mass of the mixture. According to an embodiment, the mixture comprises 1, 2, 3, 4, 5, 6, 7, 8, 9, 10, 11, 12, 13, 14, 15, 16, 17, 18, 19 or 20% of catalysts by mass with respect to the total mass the mixture. According to an embodiment, the binder comprises from 0% to 20%, preferably from 0% to 15%, more preferably from 1% to 10%, of catalysts by mass with respect to the total mass the binder. According to an embodiment, the binder comprises from 1% to 20%, preferably from 2% to 20%, from 3% to 20%, from 4% to 20%, from 5% to 20%, from 6% to 20%, from 7% to 20%, from 8% to 20%, from 9% to 20%, from 10% to 20%, from 11% to 20%, from 12% to 20%, from 13% to 20%, from 14% to 20%, from 15% to 20%, from 16% to 20%, from 17% to 20%, from 18% to 20%, from 19% to 20%, of catalysts by mass with respect to the total mass the binder. According to an embodiment, the binder comprises 1, 2, 3, 4, 5, 6, 7, 8, 9, 10, 11, 12, 13, 14, 15, 16, 17, 18, 19 or 20% of catalysts, by mass with respected to the total mass of the binder.

According to an embodiment, the mixture comprises from 0% to 20%, preferably from 0% to 15%, more preferably from 1% to 10%, of activators by mass with respect to the total mass of the mixture. According to an embodiment, the mixture comprises from 1% to 20%, preferably from 2% to 20%, from 3% to 20%, from 4% to 20%, from 5% to 20%, from 6% to 20%, from 7% to 20%, from 8% to 20%, from 9% to 20%, from 10% to 20%, from 11% to 20%, from 12% to 20%, from 13% to 20%, from 14% to 20%, from 15% to 20%, from 16% to 20%, from 17% to 20%, from 18% to 20%, from 19% to 20%, of activators by mass with respect to the total mass of the mixture or of the binder. According to an embodiment, the mixture comprises 1, 2, 3, 4, 5, 6, 7, 8, 9, 10, 11, 12, 13, 14, 15, 16, 17, 18, 19 or 20% of activators by mass with respect to the total mass of the mixture. According to an embodiment, the binder comprises from 0% to 20%, preferably from 0% to 15%, more preferably from 1% to 10%, of activators by mass with respect to the total mass of the binder. According to an embodiment, the mixture comprises from 1% to 20%, preferably from 2% to 20%, from 3% to 20%, from 4% to 20%, from 5% to 20%, from 6% to 20%, from 7% to 20%, from 8% to 20%, from 9% to 20%, from 10% to 20%, from 11% to 20%, from 12% to 20%, from 13% to 20%, from 14% to 20%, from 15% to 20%, from 16% to 20%, from 17% to 20%, from 18% to 20%, from 19% to 20%, of activators by mass with respect to the total mass of the binder. According to an embodiment, the binder comprises 1, 2, 3, 4, 5, 6, 7, 8, 9, 10, 11, 12, 13, 14, 15, 16, 17, 18, 19 or 20% of activators by mass with respect to the total mass of the binder.

According to an embodiment, the binder comprises more than 0% to 2%, preferably from more than 0%; 0.1; 0.2; 0.3; 0.4; 0.5; 0.6; 0.7; 0.8; 0.9; 1.0; 1.1; 1.2; 1.3; 1.4; 1.5; 1.6; 1.7; 1.8; 1.9 or 2% of activators and/or of catalysts by mass with respect to the total mass of the binder.

According to an embodiment, the mixture comprises from 0% to 20%, preferably from 0% to 15%, more preferably from 1% to 10%, of activators by molar quantity with respect to the total quantity of the mixture. According to an embodiment, the mixture comprises from 1% to 20%, preferably from 2% to 20%, from 3% to 20%, from 4% to 20%, from 5% to 20%, from 6% to 20%, from 7% to 20%, from 8% to 20%, from 9% to 20%, from 10% to 20%, from 11% to 20%, from 12% to 20%, from 13% to 20%, from 14% to 20%, from 15% to 20%, from 16% to 20%, from 17% to 20%, from 18% to 20%, from 19% to 20%, of activators by molar quantity with respect to the total quantity of the mixture. According to an embodiment, the mixture comprises 1, 2, 3, 4, 5, 6, 7, 8, 9, 10, 11, 12, 13, 14, 15, 16, 17, 18, 19 or 20% of activators by molar quantity with respect to the total quantity of the mixture. According to an embodiment, the binder comprises from 0% to 20%, preferably from 0% to 15%, more preferably from 1% to 10%, of activators by molar quantity with respect to the total quantity of the binder. According to an embodiment, the binder comprises from 1% to 20%, preferably from 2% to 20%, from 3% to 20%, from 4% to 20%, from 5% to 20%, from 6% to 20%, from 7% to 20%, from 8% to 20%, from 9% to 20%, from 10% to 20%, from 11% to 20%, from 12% to 20%, from 13% to 20%, from 14% to 20%, from 15% to 20%, from 16% to 20%, from 17% to 20%, from 18% to 20%, from 19% to 20%, of activators by molar quantity with respect to the total quantity of the binder. According to an embodiment, the binder comprises 1, 2, 3, 4, 5, 6, 7, 8, 9, 10, 11, 12, 13, 14, 15, 16, 17, 18, 19 or 20% of activators by molar quantity with respect to the total quantity of the binder.

According to an embodiment, the mixture comprises from 1% to 30%, preferably from 5% to 20%, of secondary additives by mass with respect to the total mass of the mixture or of the binder. According to an embodiment, the mixture comprises from 1% to 30%, preferably from 2% to 30%, 3% to 30%, 4% to 30%, 5% to 30%, 6% to 30%, 7% to 30%, 8% to 30%, 9% to 30%, 10% to 30%, 12% to 30%, 13% to 30%, 14% to 30%, 15% to 30%, 16% to 30%, 17% to 30%, 18% to 30%, 19% to 30%, 20% to 30%, 21% to 30%, 22% to 30%, 23% to 30%, 24% to 30%, 25% to 30%, 26% to 30%, 27% to 30%, 28% to 30%, or 29% to 30% of secondary additives by mass with respect to the total mass of the mixture or of the binder. According to an embodiment, the mixture comprises 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30% of additives by mass with respect to the total mass of the mixture or of the binder.

According to an embodiment, the addition of secondary additive enables an increase from 1% to 100%, preferably from 5% to 60% in the mechanical performance, in particular of the compressive strength, of the material obtained from the ettringite binder according to the invention, with respect to the same mixture according to the invention without secondary additive.

Advantageously, the addition of the secondary additive in the mixture according to the invention leads to a synergy of the mechanical performance of the material obtained from the ettringite binder according to the invention. Advantageously, the addition of secondary additive in the mixture according to the invention, reduces the water requirements and modifies the dimensional shrinkage during use of the ettringite binder according to the invention.

According to an embodiment, the mixture according to the invention further comprises an adjuvant, preferably chosen among water reducers and/or superplasticisers, water repellents, anti-foaming agents, air-entraining agents, and/or fibres.

According to an embodiment, the water reducer and/or superplasticiser is a polymer; preferably chosen among poly(meth)acrylates, polycarboxylates, and/or polyolefins such as polyethylenes (PE), or the copolymers thereof; more preferably the water reducer is chosen among the products marketed by the company SIKA: Tempo 9®, Tempo 12®, Viscocrete 125®, Viscocrete 150®, Viscocrete 225®, Viscocrete 430®, Viscocrete 111®, Viscocrete 510® or Viscocrete 250®.

According to an embodiment, the water reducer is not a lignosulfonate.

According to an embodiment, the water-repellent agent is chosen among silicones and/or carboxylic acid salts; preferably silicones and/or stearates. According to an embodiment, the water-repellent agent is chosen among the commercial products SIKA Hydrofuge HW®, SIKA WT-115®, Dow Corning SHP 50®, Dow Corning SHP 60+®, and Dow Corning IE 6692®. According to an embodiment, the water-repellent agent is chosen among magnesium stearate, calcium stearate and aluminium stearate.

According to an embodiment, the anti-foaming agent is a siloxane, preferably a poly(siloxane), more preferably polydimethylsiloxane (PDMS).

According to an embodiment, the air entraining agent is chosen among the commercial products SIKA AER®, preferably SIKA AER 5® and SIKA AER 200®. The term "air entraining agent" in the present invention means any compound or chemical formulation that allows fine bubbles of air to be brought into a mixture. According to an embodiment, the air entraining agent provides air bubbles with a mean diameter from 10 to 500 µm.

According to an embodiment, the fibres are chosen among metal fibres, polymer fibres such as polyethylene fibres, vegetable fibres and/or glass fibres.

According to an embodiment, the curing agents are chosen among the commercial products Pieri Cure & Fix®, and Antisol®. In the present invention, "curing product" means any compound capable of limiting the evaporation of water during the hardening of the concrete or mortar produced from ettringite binder according to the invention.

According to an embodiment, the formwork release oil is chosen among the natural or synthetic, vegetable or mineral oils; preferably vegetable oils; more preferably the oil Decoffre Emulsion Végétale E® marketed by SIKA or the oil Decoffrage Végétale® marketed by Deltapro.

According to one embodiment, the ettringite binder is anhydrous. According to one embodiment, the ettringite binder does not comprise any water amount sufficient for hydrating the compounds of the mixture and/or for achieving the hardening of the ettringite binder. According to one embodiment, the ettringite binder further comprises water.

According to one embodiment, the ettringite binder or the mixture of the invention is characterized by:
- a saturation level of calcium hydroxide, denoted Sat(CH), in a range from 0.75 to 8; and/or
- a stoichiometric ratio of calcium sulfate, denoted RMK, in the range from 0.05 to 1.25; the parameter RMK been defined by the following equation:

$$RMK = \frac{[Qm(C\$) \times 592000]}{IPZ \times Q(MK) \times 3}$$

in which:
IPZ represents the pozzolanic index of the aluminosilicate source;
Q(MK) represents the quantity in grams of aluminosilicates present in the ettringite binder; and
Qm(C$) represents the quantity in moles of calcium sulfate present in the ettringite binder.

According to an embodiment, the pozzolanic index IPZ is in the range from 200 to 2200 mg/g, preferably from 400 to 2000 mg/g, more preferably from 600 to 1800 mg/g. According to an embodiment, the pozzolanic index IPZ is in a range from 200 to 2200 mg/g, preferably from 550 to 2200 mg/g, from 600 to 2200 mg/g, from 700 to 2200 mg/g, from 800 to 2200 mg/g, from 900 to 2200 mg/g, from 1000 to 2200 mg/g, from 1100 to 2200 mg/g, from 1200 to 2200 mg/g, from 1300 to 2200 mg/g, from 1400 to 2200 mg/g, from 1500 to 2200 mg/g, from 200 to 1900 mg/g, from 200 to 1800 mg/g, from 200 to 1700 mg/g, from 200 to 1600 mg/g, from 200 to 1500 mg/g, from 200 to 1400 mg/g, from 200 to 1300 mg/g, from 200 to 1200 mg/g, from 200 to 1100 mg/g, from 200 to 1000 mg/g, from 200 to 900 mg/g. According to an embodiment, the pozzolanic index IPZ is 600, 700, 800, 900, 1000, 1100, 1200, 1300 or 1400 mg/g.

According to an embodiment, the parameter RMK as defined above is in the range from 0.05 to 1.25; preferably from 0.1 to 1; more preferably from 0.2 to 0.8. According to an embodiment, the parameter RMK as defined above, is from 0.1 to 1.25; from 0.2 to 1.25; from 0.3 to 1.25; from 0.4 to 1.25; from 0.5 to 1.25; from 0.6 to 1.25; from 0.7 to 1.25; from 0.8 to 1.25; from 0.9 to 1.25; from 1 to 1.25. According to an embodiment, the parameter RMK as defined above, is from 0.1 to 1.25; from 0.1 to 1.2; from 0.1 to 1.25; from 0.1 to 1.1; from 0.1 to 1; from 0.1 to 0.9; from 0.1 to 0.8; from 0.1 to 0.7; from 0.1 to 0.6; from 0.1 to 0.5; from 0.1 to 0.4; from 0.1 to 0.3; or from 0.1 to 0.2. According to an embodiment, the parameter RMK as defined above, is in a range from 0.20 to 0.80; preferably from 0.25 to 0.80; 0.30 to 0.80; 0.35 to 0.80; 0.40 to 0.80; 0.45 to 0.80; 0.50 to 0.80; 0.55 to 0.80; 0.60 to 0.80; 0.65 to 0.80; or 0.70 to 0.80. According to an embodiment, the parameter RMK as defined above, is in a range from 0.20 to 0.80; preferably from 0.20 to 0.75; from 0.20 to 0.70; from 0.20 to 0.65; from 0.20 to 0.60; from 0.20 to 0.55; from 0.20 to 0.50; from 0.20 to 0.45; from 0.20 to 0.40; from 0.20 to 0.35; from 0.20 to 0.30; or from 0.20 to 0.25.

According to an embodiment, the parameter Sat(CH) as defined above, is in a range from 0.75 to 20; preferably from 1 to 15. According to an embodiment, the parameter Sat(CH) as defined above, is 1, 2, 3, 4, 5, 6, 7, 8, 9, 10, 11, 12, 13, 14, 15, 16, 17, 18, 19, or 20. According to an embodiment, the parameter Sat(CH) as defined above, is in a range from 0.75 to 8; preferably from 1 to 8; from 2 to 8; from 3 to 8; from 4 to 8; from 5 to 8; from 6 to 8; or from 7 to 8. According to an embodiment, the parameter Sat(CH) is equal to 1, 2, 3, 4, 5, 6, 7 or 8. According to an embodiment, the parameter Sat(CH) as defined above, is in a range from 0.75 to 8; from 0.75 to 7; from 0.75 to 6; from 0.75 to 5; from 0.75 to 4; from 0.75 to 3; from 0.75 to 2; or from 0.75 to 1.

According to an embodiment, the sodium hydroxide rate in these limes may be determined by all the methods well-known by the skilled artisan such as for example, the Leduc Method (Hornain, 1995).

Ettringite Binder

The invention also concerns a hydraulic binder, preferably an ettringite binder. In particular, the invention concerns an ettringite binder that can be obtained by the method according to the invention, as described above.

According to an embodiment, the ettringite binder is obtained from a mixture of at least:
- an aluminosilicate source as previously described;
- a calcium sulfate source as previously described; and
- a calcium hydroxide source as previously described.

According to an embodiment, the ettringite binder is obtained from a mixture of at least:
- an aluminosilicate source as previously described;
- a calcium sulfate source as previously described;
- a calcium hydroxide source as previously described; and
- at least one activator as previously described, preferably selected from compounds suitable for complexing with cations, preferably compounds suitable for complexing with calcium, aluminium and/or silicon.

According to an embodiment, the ettringite binder has a parameter RMK, as defined above, in the range from 0.05 to 1.25; preferably from 0.1 to 1; more preferably from 0.2 to 0.8. According to an embodiment, the parameter RMK as defined above, is from 0.1 to 1.25; from 0.2 to 1.25; from 0.3 to 1.25; from 0.4 to 1.25; from 0.5 to 1.25; from 0.6 to 1.25; from 0.7 to 1.25; from 0.8 to 1.25; from 0.9 to 1.25; from 1 to 1.25. According to an embodiment, the parameter RMK as defined above, is from 0.1 to 1.25; from 0.1 to 1.2; from 0.1 to 1.25; from 0.1 to 1.1; from 0.1 to 1; from 0.1 to 0.9; from 0.1 to 0.8; from 0.1 to 0.7; from 0.1 to 0.6; from 0.1 to 0.5; from 0.1 to 0.4; from 0.1 to 0.3; or from 0.1 to 0.2. According to an embodiment, the parameter RMK as defined above, is in a range from 0.20 to 0.80; preferably from 0.25 to 0.80; 0.30 to 0.80; 0.35 to 0.80; 0.40 to 0.80; 0.45 to 0.80; 0.50 to 0.80; 0.55 to 0.80; 0.60 to 0.80; 0.65 to 0.80; or 0.70 to 0.80. According to an embodiment, the parameter RMK as defined above, is in a range from 0.20 to 0.80; preferably from 0.20 to 0.75; from 0.20 to 0.70; from 0.20 to 0.65; from 0.20 to 0.60; from 0.20 to 0.55; from 0.20 to 0.50; from 0.20 to 0.45; from 0.20 to 0.40; from 0.20 to 0.35; from 0.20 to 0.30; or from 0.20 to 0.25.

According to an embodiment, the parameter Sat(CH) as defined above, is in a range from 0.75 to 20; preferably from 1 to 15. According to an embodiment, the parameter Sat(CH) as defined above, is 1, 2, 3, 4, 5, 6, 7, 8, 9, 10, 11, 12, 13, 14, 15, 16, 17, 18, 19, or 20. According to an embodiment, the ettringite binder has a parameter Sat(CH), as defined above, in a range from 0.75 to 8; preferably from 1 to 8; from 2 to 8; from 3 to 8; from 4 to 8; from 5 to 8; from 6 to 8; or from 7 to 8. According to an embodiment, the parameter Sat(CH) is equal to 1, 2, 3, 4, 5, 6, 7 or 8. According to an embodiment, the parameter Sat(CH) as defined above, is in a range from 0.75 to 8; from 0.75 to 7; from 0.75 to 6; from 0.75 to 5; from 0.75 to 4; from 0.75 to 3; from 0.75 to 2; or from 0.75 to 1.

Uses

The invention also concerns the use of the binder according to the invention, as described above, preferably of the ettringite binder, for the preparation of construction materials.

According to an embodiment, the ettringite binder according to the invention is used for preparing cement, masonry cement, road binder, concrete, mortar and/or formulated lime.

Construction Material

According to an embodiment, the invention also concerns a material obtained from the hydraulic binder according to the invention as described above, preferably from the ettringite binder.

According to an embodiment, the material is obtained by hydrating the hydraulic binder according to the invention. According to an embodiment, the material is obtained by hydrating the ettringite binder according to the invention.

During the hydration of the ettringite binder, two chemical reactions are implemented enabling ettringite to be obtained:

(1) Reaction between the lime and the aluminosilicate leading to the formation of calcium aluminate (C4AH13 in cement chemist notation)

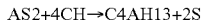

AS2+4CH→C4AH13+2S (2) Reaction of the calcium aluminate formed in (1) with calcium sulfate leading to the formation of ettringite

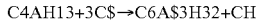

C4AH13+3C$→C6A$3H32+CH

The chemical equation of the hydration reaction of the ettringite binder is:

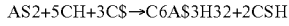

AS2+5CH+3C$→C6A$3H32+2CSH

In the present invention, the hydration of the ettringite binder according to the invention leads to a material, the density of which depends on the intended applications. According to an embodiment, the material according to the invention has a density which is more than 0 to 2.1 kg/L, preferably from 1 to 2 kg/L, more preferably the density is approximately 1.9 kg/L. Advantageously, the density of the material according to the invention is less than that of materials obtained using Portland cement.

According to an embodiment, the material is a cement, a masonry cement, a road binder, a concrete, a mortar and/or a formulated lime.

According to an embodiment, the mechanical performance, such as the compression strength, of a material obtained from the ettringite binder according to the invention are increased by from 1% to 100%, preferably from 5% to 80%, more preferably from 40% to 70% with respect to materials originating from conventional pozzolanic compositions such as those obtained from a mixture of aluminosilicate and lime.

According to an embodiment, the material further comprises an adjuvant, preferably chosen among curing agents, and/or formwork release oils. The term "formwork release oil" means an oil spread on the surfaces of formwork in order to facilitate mould release of the concrete or mortar hardened in said formwork.

According to an embodiment, the material obtained from the ettringite binder according to the invention does not have any, or has only a small degree of, shrinkage during its moulding.

According to an embodiment, the material obtained from the ettringite binder according to the invention does not comprise any Portland cement.

According to an embodiment, the material obtained from the ettringite binder according to the invention has a compressive strength at 3 days in a range of more than 0 to 60 MPa, preferably from 2 to 45 MPa, more preferably from 10 to 40 MPa. According to an embodiment, the material obtained from the ettringite binder according to the invention has a compressive strength at 3 days in a range of more than 1 to 60 MPa, preferably from 2 to 50 MPa, preferably from 10 to 50 MPa, preferably from 15 to 50 MPa, preferably from 20 to 50 MPa, preferably from 25 to 50 MPa, preferably from 30 to 50 MPa, preferably from 35 to 50 MPa, preferably from 40 to 50 MPa, or preferably from 45 to 50 MPa. According to an embodiment, the material obtained from the ettringite binder according to the invention has a compressive strength at 3 days of approximately 14 MPa, 21 MPa, 23 MPa or 26 MPa.

According to an embodiment, the material obtained from the ettringite binder according to the invention has a compressive strength at 7 days in a range of more than 0 to 60 MPa, preferably from 2 to 45 MPa, more preferably from 10 to 40 MPa. According to an embodiment, the material obtained from the ettringite binder according to the invention has a compressive strength at 7 days in a range of more than 1 to 60 MPa, preferably from 2 to 50 MPa, preferably from 10 to 50 MPa, preferably from 15 to 50 MPa, preferably from 20 to 50 MPa, preferably from 25 to 50 MPa, preferably from 30 to 50 MPa, preferably from 35 to 50 MPa, preferably from 40 to 50 MPa, or preferably from 45 to 50 MPa. According to an embodiment, the material obtained from the ettringite binder according to the invention has a compressive strength at 7 days of approximately 11 MPa, 17 MPa, 18 MPa, 21 MPa, 27 MPa, 30 MPa, 31 MPa, 32 MPa, 33 MPa, 35 MPa, 42 MPa or 46 MPa.

According to an embodiment, the material obtained from the ettringite binder according to the invention has a compressive strength at 28 days in a range of more than 0 to 150 MPa, preferably from 2 to 100 MPa, more preferably from 20 to 90 MPa. According to an embodiment, the material obtained from the ettringite binder according to the invention has a compressive strength at 28 days in a range of more than 2 to 150 MPa, preferably 20 to 150 MPa, preferably 30 to 150 MPa, preferably 40 to 150 MPa, preferably 50 to 150 MPa, preferably 60 to 150 MPa, preferably 70 to 150 MPa, preferably 80 to 150 MPa, preferably 90 to 150 MPa, preferably 100 to 150 MPa, preferably 110 to 150 MPa, preferably 120 to 150 MPa, preferably 130 to 150 MPa, preferably 140 to 150 MPa. According to an embodiment, the material obtained from the ettringite binder according to the invention has a compressive strength at 28 days in a range of more than 2 to 150 MPa, preferably from 2 to 140 MPa, preferably from 2 to 130 MPa, preferably from 2 to 130 MPa, preferably from 2 to 120 MPa, preferably from 2 to 120 MPa, preferably from 2 to 110 MPa, preferably from 2 to 100 MPa, preferably from 2 to 90 MPa, preferably from 2 to 80 MPa, preferably from 2 to 70 MPa, preferably from 2 to 60 MPa, preferably from 2 to 50 MPa, preferably from 2 to 40 MPa, preferably from 2 to 30 MPa, preferably from 2 to 20 MPa. According to an embodiment, the material obtained from the ettringite binder according to the invention has a compressive strength at 28 days of approximately 44 MPa, 52 MPa or 54 MPa.

According to an embodiment, the material obtained from the ettringite binder according to the invention has a flexural strength at 28 days in a range of more than 0 to 15 MPa, preferably from 1 to 10 MPa, more preferably from 2 to 9 MPa. According to an embodiment, the material obtained from the ettringite binder according to the invention has a flexural strength at 28 days in a range of more than 0 to 15 MPa, preferably from 1 to 10 MPa, more preferably from 2 to 6 MPa. According to an embodiment, the material obtained from the ettringite binder according to the invention has a flexural strength at 28 days in the range of more than 0 to 10 MPa, preferably from 1, 2, 3, 4, 5, 6, 7, 8, 9 or 10 MPa.

In the present invention, the compressive strength tests have been performed on previously moulded compositions (cubic moulds, 40 mm×40 mm, or 10 cm×10 cm) using the Controlab E0250/15 KN class A instrument, or using cylindrical samples (16 cm×32 cm). The compressive strength measurements have also been performed on walls using the Controlab sclerometer instrument.

Method for Preparing a Construction Material

According to an embodiment, the invention also concerns a method for preparing a construction material comprising the preparation and/or use of an ettringite binder as described above.

According to an embodiment, the method for preparing a construction material further comprises a step of mixing the above-described ettringite binder with water.

According to an embodiment, the method for preparing a construction material further comprises a step of moulding the material.

According to an embodiment, the method for preparing a construction material from the ettringite binder according to the invention does not comprise the use of Portland cement. According to an embodiment, the method for preparing a construction material from the ettringite binder according to the invention does not comprise the use calcium sulfoaluminate.

EXAMPLES

The present invention will be better understood on reading the following examples which illustrate the invention in a non-limiting manner.

ABBREVIATIONS

- A: in cement chemist notation designates aluminium oxide ($Al_2O_3$) or alumina;
- AS2: in cement chemist notation designates a metakaolin;
- C: in cement chemist notation designates calcium oxide (CaO);
- CH: in cement chemist notation designates calcium hydroxide ($Ca(OH)_2$);
- C$H2: in cement chemist notation designates gypsum;
- C4AH13: in cement chemist notation designates tetracalcium aluminate;
- CxSH: in cement chemist notation designates a calcium silicate where x varies from 1 to 3, preferably from 1.2 to 2.5;
- C2ASH8: in cement chemist notation designates hydrated gehlenite;
- C4A3S: in cement chemist notation designates ye'elemite;
- C2S: in cement chemist notation designates belite;
- C$: in cement chemist notation designates calcium sulfate;
- C6A$3H32: in cement chemist notation designates ettringite;
- C4A$H20: in cement chemist notation designates tricalcium alumino monosulfate;
- CL: natural air lime ("calcic lime");
- DSF: desulfogypsum;
- E/L: mass ratio of water with respect to the binder;
- IPZ: pozzolanic index of the metakaolin employed;
- L/T: mass ratio of binder with respect to the total dry matter (binder, additives, etc.);
- MK: metakaolin;
- MSLK: sodium metasilicate pentahydrate;
- NaHFS: sodium hexafluorosilicate;
- NaHFA: sodium hexafluoroaluminate;
- $NaAlO_2$: sodium aluminate;
- NaF: sodium fluoride;
- P: quarry gypsum;
- P(C$): purity of the calcium sulfate source;
- R: gypsum from demolition;
- RMK: the quantity of calcium sulfate with respect to the quantity of metakaolin, introduced into the initial mixture and defined according to equation (e3);
- S: in cement chemist notation designates silicon dioxide ($SiO_2$) or silica;
- S: in cement chemist notation designates sulfur trioxide ($SO_3$);
- Sc: dryness in the mixture;
- H: in cement chemist notation designates water ($H_2O$);
- Sat(CH): the mass saturation of calcium hydroxide, $Ca(OH)_2$ in a given composition;
- TEA: triethanolamine Material and Methods Material The aluminosilicates and metakaolins are supplied by Argeco (product Argicem®) or by Imerys (products Argical M1000®, Argical M1200S, MetaStar M501), by Soka (Soka Metasial®) or are fines originating from the chamotte industry or are produced in the laboratory according to the conventional protocols.

Various limes have been supplied by LHOIST (lime LHOIST® CL80, lime LHOIST® CL90, lime LHOIST Sorbacal®) or by C.E.S.A. (slaked air lime Decorchaux® CL90). The calcium hydroxide content in these limes has been determined using the Leduc method (Hornain, 1995).

Various sources of calcium sulfate, such as gypsum, have been tested. The products have been obtained from various suppliers known to a person skilled in the art.

Properties of the Mixture According to the Invention

The mixture according to the invention is characterised by the parameters as defined below.

The pozzolanic index (IPZ) is a parameter representing the active fraction of a metakaolin, in other words the quantity of calcium hydroxide, $Ca(OH)_2$, that can be fixed in 1 gram of metakaolin. This index can be determined by the methods known to a person skilled in the art, such as by the Chapelle test for example.

The parameter Sat(CH) represents the level of saturation by mass of calcium hydroxide, $Ca(OH)_2$ in a given composition. It is determined according to the following equation (e1):

$$Sat(CH) = \frac{Q(CH)}{QST(CH)} \quad (e1)$$

where:
- Q(CH) represents the quantity in grams of calcium hydroxide ($Ca(OH)_2$) in the binder; and
- QST(CH) represents the quantity in grams of calcium hydroxide necessary for the reaction forming ettringite. The parameter QST(CH) can be determined according to the following equation (e2):

$$QST(\text{CH}) = \frac{[IPZ \times Q(MK) \times 0.000625]}{P(\text{CH})} \quad (e2)$$

where:
IPZ represents the pozzolanic index as defined above;
Q(MK) represents the quantity in grams of metakaolin or aluminosilicates present in the binder; and
P(CH) represents the purity of the lime, in calcium hydroxide.

The parameter RMK represents the stoichiometric ratio of calcium sulfate with respect to the quantity of aluminosilicates, such as metakaolin, introduced in the initial mixture. The parameter QST(CH) can be determined according to the following equation (e3):

$$RMK = \frac{[Qm(C\$) \times 592000]}{IPZ \times Q(MK) \times 3} \quad (e3)$$

where:
IPZ represents the pozzolanic index as defined above;
Q(MK) represents the quantity in grams of metakaolins or aluminosilicates present in the binder; and
Qm(C$) represents the quantity in moles of calcium sulfate present in the binder. The parameter Qm(C$) can be determined according to the following equation (e4):

$$Qm(C\$) = \frac{[Q(G) \times P(C\$) \times Sc]}{M} \quad (e4)$$

where:
Q(G) represents the quantity, in grams, of calcium sulfate source introduced in the initial mixture;
P(C) represents the purity by mass of the calcium sulfate source;
Sc represents the dryness, in other words the percentage by mass of dry matter contained in the mixture.

Compressive Strength

The compressive strength tests have been performed on previously moulded compositions (cubic moulds, 40 mm×40 mm, or 10 cm×10 cm) using the Controlab E0250/15 KN class A instrument, or using cylindrical samples (16 cm×32 cm).

The compressive strength measurements have also been performed on walls using the Controlab sclerometer instrument.

Part A: Compositions

Example 1: Preparation of an Ettringite Binder According to the Method of the Invention General Protocol The ettringite binders according to the invention were prepared at ambient temperature, by mixing an aluminosilicate, a calcium sulfate and lime in proportions such that the ratio RMK as defined above is in the range from 0.05 to 1.25; and such that the lime saturation parameter, Sat(CH), is in the range from 0.75 to 8.

According to the invention, to this mixture (aluminosilicate/calcium sulfate/lime) can be added (i) alkali catalysts, (ii) reaction activators, and/or (iii) secondary additives such as fillers, preferably calcareous fillers.

Examples of Mixtures According to the Invention Comprising an Aluminosilicate, a Calcium Sulfate and Lime

TABLE 1

Examples of mixtures for preparing an ettringite binder according to the invention.

| Mixture No. | 1 | 2 | 3 | 4 | 5 | 6 |
|---|---|---|---|---|---|---|
| Aluminosilicate | Argical ® M1000 | Argical ® M1000 | Argical ® M1000 | Chamotte fines | Chamotte fines | Synthesised product |
| IPZ | 1000 | 1000 | 1000 | 850 | 900 | 600 |
| Calcium sulfate | Titano-gypsum | Titano-gypsum | Desulfo-gypsum | Titano-gypsum | Titano-gypsum | Desulfo-gypsum |
| Lime | CL90 | CL90 | CL90 | CL90 | CL80 | CL90 |
| RMK | 0.88 | 0.91 | 0.49 | 0.86 | 1.03 | 0.96 |
| Sat(CH) | 1.15 | 1.02 | 1.03 | 1.19 | 1.01 | 1.19 |

| Mixture No. | 7 | 8 | 9 | 10 | 11 |
|---|---|---|---|---|---|
| Aluminosilicate | Argicem ® | Argical ® M1200S | Metastar ® M501 | Argical ® M1000 | Argical ® M1000 |
| IPZ | 700-800 | 1400 | 950 | 1000 | 1000 |
| Calcium sulfate | Gypsum | Quarry calcium sulfate | Quarry calcium sulfate | Quarry calcium sulfate | Quarry calcium sulfate |
| Lime | CL90 | CL90 | CL90 | CL90 | CL90 |
| RMK | 0-1 | 0.93 | 0.90 | 0.60 | 0.91 |
| Sat(CH) | 1-1.1 | 1.10 | 1.07 | 1.10 | 1.07 |

Examples of Catalysts

Catalysts have also been added in mixtures 1 to 11 as described above (Table 1).

The catalysts employed have been chosen among: sodium fluoride, sodium hexafluoroaluminate, sodium hexafluorosilicate, sodium fluorophosphate, potassium tetrafluoroaluminate, sodium metasilicate, sodium orthosilicate, sodium trisilicate, sodium disilicate, sodium aluminate, sodium phosphate, sodium carbonate and sodium sulfate.

Examples of Activators

Activators have also been added in mixtures 1 to 11 as described above (Table 1). The activators employed have been chosen among the compounds suitable for complexing cations, in particular calcium, such as sucrose, tartaric acid, citric acid, gluconic acid, mandelic acid, lactic acid, or an ethanolamine such as triethanolamine (TEA).

Example 2: Preparation of a Material from the Ettringite Binder According to the Invention It has been possible to obtain various materials by mixing the ettringite binder according to the invention with a quantity of water, the water being modulated according to the intended application.

During the hydration of the ettringite binder, two chemical reactions are implemented enabling ettringite to be obtained:

(1) Reaction between the lime and the aluminosilicate leading to the formation of calcium aluminate (C4AH13 in cement chemist notation)

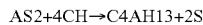
$$AS2+4CH \rightarrow C4AH13+2S$$

(2) Reaction of the calcium aluminate formed in (1) with calcium sulfate leading to the formation of ettringite

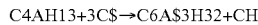
$$C4AH13+3C\$ \rightarrow C6A\$3H32+CH$$

The chemical equation of the hydration reaction of the ettringite binder is:

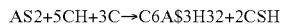
$$AS2+5CH+3C \rightarrow C6A\$3H32+2CSH$$

The following examples show the performance for the materials obtained from the ettringite binder according to the invention.

Example 3: Preparation of a Material from an Ettringite Binder Comprising a Metakaolin/Lime/Gypsum Mixture without Catalyst or Activation, and Performance of this Material The aim of this experiment is to show the performance of a material originating from the hydration of an ettringite binder obtained from a mixture of metakaolin, lime and gypsum, for which the parameter Sat(CH) is from 1 to 1.1 for various values of the parameter RMK as defined above.

For this, a comparison has been carried out between a material originating from the ettringite binder obtained by the mixing of:

flash metakaolin ARGICEM® with IPZ between 700 and 800 mg/g;

a slaked lime of type CL90 with LEDUC lime content of approximately 90%; and gypsum;

and a material originating from a conventional pozzolanic composition (i.e. mixture of lime and metakaolins).

FIG. 1 is a graph showing the percentage increase in mechanical performance, after 28 days, of the mixture according to the invention with respect to those of a conventional pozzolanic composition, as a function of the value of the parameter RMK.

The results show that:

for RMK values between 0 and 1, an increase in performance is always observed for the material originating from the ettringite binder according to the invention; and for RMK values between 0.25 and 0.75 an increase greater than 40% is obtained compared to the performance of a conventional pozzolanic composition.

In conclusion, these results demonstrate that the mixture according to the invention enables significant increase in the mechanical performance, after 28 days, of the product obtained from the binder according to the invention. Furthermore, the applicant has found in complementary experiments that from an RMK value of 0.6, an additional gain can be obtained depending on the nature of the gypsum.

Performance in the Early Stages

One of the major disadvantages of a conventional pozzolanic binder (i.e. a mixture of lime and metakaolin) obtained from Portland cement, is its very slow setting speed (or hardening speed) resulting in poor mechanical performance in the early stages. A study has therefore been carried out to evaluate the performance of the ettringite binder according to the invention over shorter times, namely 3 days (D+3) or 7 days (D+7) after production of the mixture comprising:

flash metakaolin ARGICEM® with IPZ between 700 and 800 mg/g;

a slaked lime of type CL90 with LEDUC lime content of approximately 90%; and gypsum.

Figure 2:
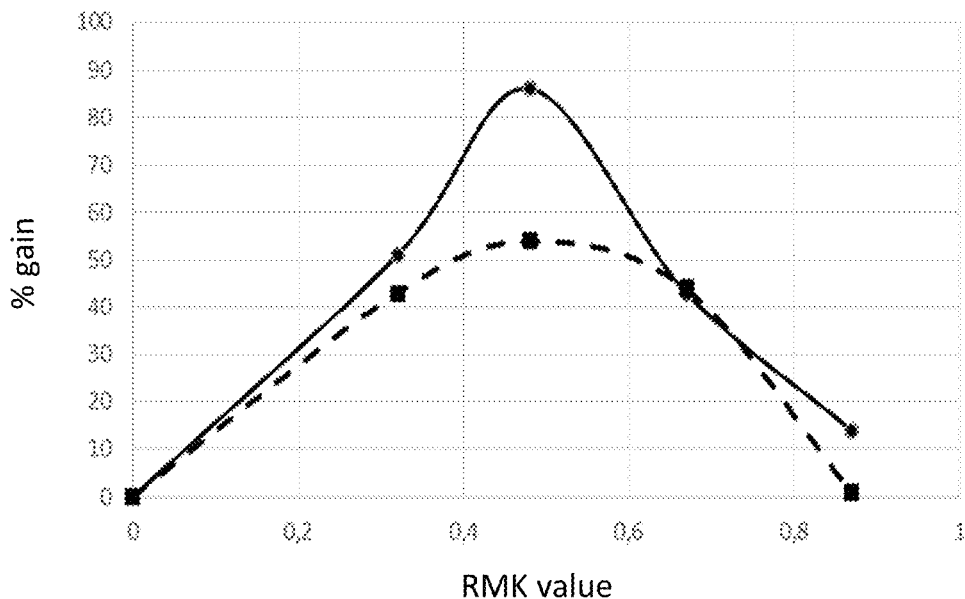
FIG. 2 is a graph showing the percentage increase in mechanical performance after 3 days (continuous line) or after 7 days (dashed line), for an ettringite binder obtained from the mixture according to the invention with respect to those of a conventional pozzolanic composition, as a function of the value of the parameter RMK.

FIG. 2 is a graph showing the percentage increase in mechanical performance, after 3 days or after 7 days, for an ettringite binder obtained from the mixture according to the invention with respect to those of a conventional pozzolanic composition, as a function of the value of the parameter RMK.

The results show comparable results to those obtained after 28 days. Indeed, it is also observed that:

for RMK values between 0.3 and 0.7, a gain greater than 40% is obtained compared to the performance of a conventional pozzolanic composition; and for values greater than 0.7, a strong decrease in the gain is observed.

In conclusion, these results show that the mixture according to the invention makes it possible to very quickly obtain an ettringite binder having good mechanical performance (compressive strength) even in very short times, times in which conventional pozzolan compositions are not able to deliver mechanical strengths that are acceptable for their use as construction materials.

Example 4: Preparation of a Material from an Ettringite Binder Comprising a Metakaolin/Lime/Gypsum Mixture in the Presence of a Catalyst and an Activator—Comparison of the RMK The aim is to compare the performance of a material obtained from a binder according to the invention, for RMK values greater than 0.6.

To do this, a material was prepared by hydration of an ettringite binder comprising Argical M1000®/quarry calcium sulfate/lime CL90 in the presence of a catalyst and activator. The parameter Sat(CH) is 1.07-1.1. The water/binder ratio is approximately 0.53.

The compressive strength (RC) at 28 days has been measured for two RMK values:

| RMK | RC (MPa) |
|---|---|
| 0.6 | 44 |
| 0.91 | 54 |

These results show that an increased gain is obtained for RMK values greater than 0.6 when the material is prepared from an ettringite binder comprising a catalyst and/or an activator.

Example 5: Preparation of a Material from an Ettringite Binder Comprising a Metakaolin/Lime/Gypsum Mixture in the Presence of a Catalyst and Performance of this Material The aim of this experiment was to study the mechanical performance of an ettringite binder obtained from a metakaolin/lime/gypsum mixture with or without alkali catalyst.

The metakaolin/lime/gypsum mixture is characterised by an RMK value equal to 0.67 and an Sat(CH) value approximately equal to 1.03.

Various catalysts have been tested: sodium fluoride, sodium aluminate, trisodium phosphate, sodium orthosilicate and sodium metasilicate and sodium hexafluorate.

The compressive strength (RC) was measured 3 days (D+3) or 7 days (D+7) after the preparation of the mixture. The results are presented in Table 2 below.

TABLE 2

Compressive strength and percentage gain for the metakaolin/gypsum/lime mixtures in the presence of a catalyst.

| | D + 3 | | D + 7 | |
|---|---|---|---|---|
| Mixture | RC* (MPa) | Gain (%) | RC* (MPa) | Gain (%) |
| Without catalyst | 13.6 | — | 26.7 | — |
| Sodium fluoride | 20.9 | 54 | 32.3 | 21 |
| Sodium aluminate | 20.5 | 51 | 29.9 | 12 |
| Trisodium phosphate | 25.8 | 90 | 29.5 | 11 |
| Sodium orthosilicate | 23.2 | 70 | 31.2 | 17 |
| Sodium metasilicate | 23.9 | 75 | 33.4 | 25 |
| Sodium hexafluorosilicate | 23.9 | 75 | 33.4 | 25 |

*RC: compressive strength.

A study has also been carried out by varying the type of gypsum and the values of the parameter RMK. The results obtained after 7 days (D+7) and 28 days (D+28) are presented in Table 3 below.

TABLE 3

Percentage gain for various metakaolin/gypsum/lime mixtures in the presence of a catalyst as a function of the parameter RMK and of the gypsum source, compared with the same mixture without catalyst.

| Mixture with the catalyst: | Quantity of catalyst in the mixture (in kg/tonne of binder) | Gypsum | RMK | D + 7 Gain (%) | D + 28 Gain (%) |
|---|---|---|---|---|---|
| Sodium fluoride | 10 | Desulfogypsum | 0.76 | 31 | 18 |
| | 10 | Desulfogypsum | 0.45 | 17 | 11 |
| | 10 | Desulfogypsum | 0.3 | 11 | 5 |
| Sodium hexafluoroaluminate | 20 | Desulfogypsum | 0.3 | 35 | 13 |
| Fluorophosphate | 20 | Desulfogypsum | 0.3 | 30 | 13 |
| Sodium aluminate | 3.3 | Desulfogypsum | 0.77 | 30 | 20 |
| | 6.7 | Desulfogypsum | 0.77 | 42 | 20 |
| | 13.3 | Desulfogypsum | 0.77 | 46 | 19 |
| Sodium hexametaphosphate | 4.1 | Titanogypsum | 0.66 | 18 | 4 |
| | 8.3 | Titanogypsum | 0.66 | 31 | 17 |
| Sodium carbonate | 4.1 | Titanogypsum | 0.66 | 21 | 17 |
| Sodium borate | 4.1 | Titanogypsum | 0.66 | 21 | 17 |
| Sodium aluminate | 8.3 | Titanogypsum | 0.66 | 36 | 15 |
| | 13.1 | Titanogypsum | 0.66 | 50 | 29 |
| | 13.3 | Gypsum from demolition | 0.66 | 34 | 14 |
| | 13.3 | Gypsum from demolition | 0.43 | 31 | 34 |
| | 26.7 | Gypsum from demolition | 0.61 | 57 | 41 |

*RC: compressive strength.

The results show that the addition of an alkali catalyst in the mixture increases the compressive strength at short times (D+7) or longer times (D+28).

Example 6: Preparation of a Material from an Ettringite Binder Comprising a Metakaolin/Lime/Gypsum Mixture in the Presence of a Catalyst and an Activator and Performance of this Material The progress of the formation reaction of ettringite depends on the addition of calcium aluminate formed by the reaction between the aluminosilicate source and the calcium oxide source (lime). However the mechanical performance of the material obtained from the ettringite binder according to the invention depends on the yield from the reaction between the calcium aluminate and the calcium sulfate source (such as gypsum).

The Applicant has therefore sought to optimise the mixture according to the invention in order to provide better yields and higher compressive strengths Various compounds have been tested on a mortar base. The formulation of the mortar consists of mixing sand, water and the ettringite binder according to the invention comprising a mixture of:
flash metakaolin ARGICEM® with IPZ approximately equal to 700 mg/g;
slaked lime of type CL90 with LEDUC lime content of approximately 90%; and
desulfogypsum; and
$NaAlO_2$ (1.3%) as catalyst;
wherein
the parameter RMK is equal to 0.82;
the parameter Sat(CH) is equal to 1.03.

The mortar has a sand to binder ratio (L/T) equal to 0.33. The water to binder ratio (E/L) is between 0.47 and 0.55.

Surprisingly, the Applicant has shown that compounds able to complex calcium, such as sucrose and/or alpha hydroxy acids, make it possible to obtain improved compressive strengths after 7 and 28 days with respect to the reference formulation Ml (cf. Table 4).

TABLE 4

Performance of an ettringite binder comprising at least an activator

| Ref. | M1 | M2 | M3 | M4 | M5 | M6 | M7 | M8 | M9 | M10 | M11 | M12 | M13 |
|---|---|---|---|---|---|---|---|---|---|---|---|---|---|
| Tartaric acid (kg/tonne of binder) | — | 1.3 | 1.3 | 1.3 | 1.3 | — | — | — | — | 1.3 | 1.3 | — | — |
| Sucrose (kg/tonne of binder) | — | 1.3 | — | 0.3 | 0.7 | 1.3 | 1.3 | — | — | 0.7 | 0 | 1.3 | 1.3 |
| Others (kg/tonne of binder) | — | | | | | | Citric acid (1.3) | Gluconic acid (1.3) | Citric acid (1.3) | TEA (1.3) | TEA (1.3) | Salicylic acid (1.3) | Mandelic acid (1.3) |
| E/L | 0.55 | 0.47 | 0.53 | 0.53 | 0.53 | 0.53 | 0.53 | 0.53 | 0.53 | 0.53 | 0.53 | 0.54 | 0.55 |
| RC D + 7 (MPa) | 29.2 | 39.5 | 34.7 | 33.1 | 39.2 | 36.1 | 31.4 | 36.2 | 37.2 | 35.8 | 35.6 | 32.3 | 33.1 |
| % Gain | — | 35.3 | 18.8 | 13.4 | 34.2 | 23.6 | 7.5 | 24 | 27.4 | 22.6 | 21.9 | 10.6 | 13.4 |
| RC D + 28 (MPa) | 34.5 | 52.6 | 43.6 | 46.4 | 47.8 | 43.1 | 45.8 | 42.4 | 46.8 | 48.8 | 45.6 | 38.7 | 38.7 |
| % Gain | — | 52.5 | 26.4 | 34.5 | 38.6 | 24.9 | 32.8 | 22.9 | 35.7 | 41.4 | 32.2 | 12.2 | 12.2 |

Part B: Uses of the Ettringite Binder for Producing Construction Materials

Example 7: Preparing Cement

The Applicant has prepared a plurality of cements from the ettringite binder according to the invention. The ratio of water to binder (E/L) is 0.5. The formulations and results are presented in Table 5 below.

The flexural strength and compressive strength have been measured using samples of 4×4×16 mm. The results show that the performance of these cements conforms with the compressive strength values required by standard EN-196.

TABLE 5

Performance of cements prepared from the ettringite binder according to the invention.

| | Compound (in kg for 1 tonne of binder) | Cement 1 | Cement 2 | Cement 3 | Cement 4 | Cement 5 |
|---|---|---|---|---|---|---|
| Binder formulation | Metakaolin Argicem ® | 575 | 550 | 492 | 452 | 452 |
| | Lime CL90 | 290 | 280 | 246 | 226 | 226 |
| | Dry gypsum | 95 | 162 | 246 | 226 | 226 |
| | BF slag | 0 | 0 | 0 | 65.8 | 65.8 |
| | Fillers | 40 | 0 | 0 | 0 | 0 |
| | Catalyst | 0 | NaF: 8 | NaAlO$_2$: 13.4 | MSLK: 19.4 | NaHFS: 19.4 |
| | Sucrose | 0 | 0 | 1.3 | 1.1 | 1.1 |
| | Tartaric acid | 0 | 0 | 1.3 | 1.1 | 1.1 |
| Parameters | RMK | 0.26 | 0.48 | 0.82 | 0.82 | 0.82 |
| | Sat(CH) | 1.04 | 1.05 | 1.03 | 1.03 | 1.03 |
| Performance at 28 days (MPa) | Flexing | 4.9 | 6.7 | 6.9 | 7.9 | 7.9 |
| | Compression | 33.7 | 36.4 | 44.1 | 47.6 | 47.6 |

Example 8: Road Binder Preparation

The Applicant has prepared a plurality of road binders from the ettringite binder according to the invention.

The objective is to provide a road binder able to meet the mechanical strength objectives fixed by standard NF P15-108, namely obtaining a load-bearing value (module EV2) greater than 50 MPa.

The determination of the load bearing is carried out using the "load plate test". This method involves applying a stress on a surface of normalised diameter and rigidity in order to measure its depression in the ground. This method enables determination of the Westergraad reaction coefficient (Kw), the load-bearing moduli EV1 and EV2 and the compaction ratio (EV2/EV1).

The studied binder according to the invention comprises a mixture of:
  600 kg/tonne of binder, flash metakaolin ARGICEM® with IPZ approximately equal to 700 mg/g;
  300 kg/tonne of binder, slaked lime of type CL90 with LEDUC lime content of approximately 90%; and
  100 kg/tonne of binder, gypsum;
wherein
  the parameter RMK is equal to 0.27;
  the parameter Sat(CH) is equal to 1.03.

For this purpose, a clay/sand soil with an area of 250 m$^2$ and with depth of 40 cm, was mechanically stabilised with the binder according to the invention. The dosage of binder was between 35 and 40 kg per square metre. After 28 days, the load bearing capacity EV2 was measured on this stabilised soil. The results are presented in Table 6.

TABLE 6

Properties from the load plate test obtained using the binder according to the invention.

| Kw | EV1 (MPa) | EV2 (MPa) | Compaction ratio EV2/EV1 |
|---|---|---|---|
| 55 | 40 | 74 | 1.8 |
| 58 | 39 | 79 | 2.0 |

The results show that the EV2 moduli are greater than 50 MPa.

Consequently, these results confirm that the binder according to the invention can be used as a road binder while meeting the requirements of standard NF P15-108.

Example 9: Mortar Preparation

The Applicant has prepared a plurality of mortars from the ettringite binder according to the invention.

Table 7 shows some examples of mortars prepared by the applicant by using the binder according to the invention. In this table, the quantities are expressed in kg per tonne of binder These mortars have been used as rendering mortars on various supports such as concrete or plaster, or as mortars for mounting on breeze block, hollow brick, biobrick and natural stone substrates. After 8 months of observation, no incompatibility was visually observed.

TABLE 7

Formulations and properties of mortars obtained from an ettringite binder according to the invention.

| | | | MRT1 | MRT2 | MRT3 | MRT4 | MRT5 | MRT6 | MRT7 |
|---|---|---|---|---|---|---|---|---|---|
| Formulation | MK | Type | Argicem ® | Argicem ® | Argicem ® | Argicem ® | M1000 ® | Argicem ® | Argicem ® |
| | | Quantity | 150 | 150 | 105 | 160 | 140 | 130 | 130 |
| | Lime | Type | CL90 | CL90 | CL90 | CL90 | CL90 | CL90 | CL80 |
| | | Quantity | 75 | 75 | 53 | 80 | 90 | 65 | 80 |
| | Gypsum | Type | Quarry gypsum | Quarry gypsum | Quarry gypsum | Desulfo-gypsum | Quarry gypsum | Desulfo-gypsum | Gypsum from demolition |
| | | Quantity | 75 | 75 | 18 | 45 | 55 | 65 | 90 |
| | Catalyst | Type | $NaAlO_2$ | $NaAlO_2$ | — | NaF | NaF | NaF | $NaAlO_2$ |
| | | Quantity | 4 | 4 | — | 3 | 3 | 4 | 6 |
| | Accelerator | Tartaric acid | 0.4 | 0.4 | 0 | 0 | 0 | 0.35 | 0.4 |
| | Accelerator | Sucrose | 0.4 | 0.4 | 0 | 0 | 0 | 0.35 | 0.4 |
| | Blast furnace slag | | 0 | 0 | 0 | 15 | 15 | 40 | 0 |
| Additives | SP* | Type | V225 | V225 | V225 | V150 | V150 | V225 | V430 |
| | | Quantity | 0.9 | 0.9 | 1 | 1 | 0.9 | 0.9 | 0.9 |
| | Aggregates | Fillcarb ® | 0 | 20 | 124 | 20 | 20 | 20 | 0 |
| | | Sand 0/1 | 0 | 100 | 0 | 100 | 100 | 100 | 0 |
| | | Sand 0/1 | 900 | 480 | 900 | 480 | 480 | 480 | 900 |
| Water | | | 125 | 120 | 138 | 114 | 161 | 115 | 150 |
| Parameters | RMK | | 0.82 | 0.82 | 0.28 | 0.46 | 0.45 | 0.82 | 0.91 |
| | Sat(CH) | | 1.03 | 1.03 | 1.03 | 1.03 | 0.93 | 1.03 | 1.12 |
| Performance | RC (MPa) | D + 7 | 21.9 | 31.5 | 9.6 | 42.6 | 32.1 | 39.7 | 30.1 |
| | | D + 28 | 44.6 | 51.5 | 16.8 | 45.9 | 38.7 | 50.3 | 43.6 |
| | Terracotta adhesion (MPa) | | 0.58 | 1.32 | NA | NA | NA | NA | NA |

*superplasticiser

Example 10: Concrete Preparation

The Applicant has prepared a plurality of concretes from the ettringite binder according to the invention.

Table 8 shows some examples of concretes prepared by the Applicant be using the binder according to the invention. In this table, the quantities are expressed in kg per tonne of binder

TABLE 8

Concrete formulations obtained from the binder according to the invention.

| | Compound | B1 | B2 | B3 | B4 |
|---|---|---|---|---|---|
| Formulation | Metakaolin Argicem ® | 30 | 22 | 50 | 40 |
| | Lime CL90 | 15 | 11 | 25 | 20 |
| | Gypsum | 15 | 11 | 11 | 20 |
| | Sodium aluminate | 0.80 | 0.60 | 0 | 1.07 |
| | Sucrose | 0.80 | 0.60 | 0 | 0.11 |
| | Tartaric acid | 0.80 | 0.60 | 0 | 0.11 |
| | Fill Carb ® | 0 | 0 | 2 | 2 |
| | Sand 0/1 | 0 | 55 | 17 | 17 |
| | Sand 0/4 | 105 | 44 | 85 | 85 |
| | Sand 4/10 | 84 | 121 | 84 | 84 |
| | Water | 28 | 21 | 40 | 35 |
| RC at 28 days (MPa) | Cubes 10 × 10 | 25.8 | 35.1 | NA | NA |
| | Cylinders 16 × 32 | 20.7 | 27.9 | 25.8 | 40.1 |
| | Strength class (by sclerometer) (MPa) | 20-30 | 40-50 | 25-35 | 40-50 |

Example 11: Preparation of Masonry Cement and Formulated Limes

The Applicant has prepared a plurality of masonry cements and formulated limes from the ettringite binder according to the invention.

In order to be used as masonry cement or formulated lime, the formulation must have a compressive strength after 28 days of at least 10 MPa for masonry cements and at least 3.5 MPa in the case of formulated limes.

Table 9 shows some examples of masonry cements prepared by the applicant using the binder according to the invention. In this table, the quantities are expressed in kg per tonne of binder

TABLE 9

Masonry cement and formulated lime formulations obtained from the binder according to the invention.

| Formulation | CM1 | CM2 | CM3 | CM4 | CM5 | CM6 |
|---|---|---|---|---|---|---|
| Metakaolin | Argicem ® | Argicem ® | Argicem ® | Argicem ® | Argicem ® | Argicem ® |
| Metakaolin (qty) | 270 | 268 | 332 | 332 | 333 | 332 |
| Lime CL90 | 135 | 134 | 332 | 400 | 333 | 266 |
| Gypsum | 95 | 95 | 166 | 100 | 167 | 166 |
| Calcareous filler | 500 | 500 | 167 | 165 | 167 | 233 |
| Catalyst (fluoride) | 0 | 3 | 3 | 3 | 0 | 3 |
| RMK | 0.58 | 0.58 | 0.82 | 0.49 | 0.57 | 0.57 |
| RC (D + 3) | 5.7 | 7.2 | 10.2 | 9.8 | 11.6 | 11 |
| RC (D + 7) | 9 | 14.6 | 15.8 | 13.9 | 23.4 | 23.9 |
| RC (D + 28) | 15.2 | 20.5 | 22.3 | 16.8 | 34.3 | 32.6 |

The results show that from three days, excellent results are obtained for the formulations comprising the ettringite binder according to the invention.

The invention claimed is:

1. An ettringite binder consisting of:
    at least one aluminosilicate source;
    at least one calcium sulfate source;
    at least one calcium hydroxide source;
    at least two activators selected from the group consisting of sucrose, tartaric acid and salts thereof;
    at least one alkali catalyst is selected from the group consisting of sodium fluoride, sodium aluminate, trisodium phosphate, sodium orthosilicate, sodium metasilicate, sodium hexafluorosilicate, sodium fluorophosphate, sodium hexametaphosphate, sodium hexafluoroaluminate, potassium tetrafluoroaluminate and the mixtures thereof; and
    optionally, at least one additive,
    wherein the at least one aluminosilicate source comprises metakaolin.

2. The ettringite binder according to claim 1, wherein the quantity by mass of catalyst is in a range of more than 0% to 20% with respect to the total quantity of the binder.

3. The ettringite binder according to claim 1, wherein the aluminosilicate source comprising metakaolin is selected from the group consisting of a pozzolan, a fine originating from the production of chamotte, and calcinated clay.

4. The ettringite binder according to claim 1, wherein the calcium hydroxide source is selected from the group consisting of slaked lime, hydraulic lime, quick lime, delayed-effect quick lime, air lime, conventional slaked lime, and any commercial lime.

5. The ettringite binder according to claim 1, wherein the calcium sulfate source is selected from the group consisting of anhydrite, natural gypsum and gypsum obtained as a by-product of industrial reactions.

6. The ettringite binder according to claim 5, wherein the gypsum is selected from the group consisting of desulfogypsum, titanogypsum, fluogypsum, and phosphogypsum.

7. The ettringite binder according to claim 1, wherein the aluminosilicate source is characterized by a pozzolanic activity index (IPZ), determined by the Chapelle test method, of from 200 to 2200 mg/g.

8. The ettringite binder according to claim 1, wherein the additive is selected from the group consisting of a slag, a blast furnace slag, and an amorphous aluminate slag.

9. The ettringite binder according to claim 1, wherein the binder does not require producing a clinker at high temperatures ranging from 1200-1300° C.

10. A method for preparing an ettringite binder according to claim 1, comprising mixing:
    an aluminosilicate source comprising metakaolin;
    a calcium sulfate source;
    a calcium hydroxide source;
    at least two activators selected from the group consisting of sucrose, tartaric acid and salts thereof;

at least one alkali catalyst is selected from the group consisting of sodium fluoride, sodium aluminate, trisodium phosphate, sodium orthosilicate, sodium metasilicate, sodium hexafluorosilicate, sodium fluorophosphate, sodium hexametaphosphate, sodium hexafluoroaluminate, potassium tetrafluoroaluminate and the mixtures thereof; and optionally, at least one additive, wherein the at least one aluminosilicate source comprises metakaolin.

11. The method of preparation according to claim 10, wherein the temperature at which the mixing is carried out is from more than 0° C. to 50° C.

12. A method for preparing cement, masonry cement, mortar, concrete, road binders and/or formulated lime, comprising adding the ettringite binder accorder to claim 1 to said cement, masonry cement, mortar, concrete, road binders and/or formulated lime.

* * * * *